(12) United States Patent
Havens et al.

(10) Patent No.: US 6,708,416 B1
(45) Date of Patent: Mar. 23, 2004

(54) INCLINATION SENSOR

(75) Inventors: Daniel W. Havens, Fairfield, PA (US); Steven H. Mott, Gettysburg, PA (US)

(73) Assignee: Motts and Havens Patents Pending, Gettysburg, PA (US)

( * ) Notice: Subject to any disclaimer, the term of this patent is extended or adjusted under 35 U.S.C. 154(b) by 0 days.

(21) Appl. No.: 10/348,557

(22) Filed: Jan. 21, 2003

(51) Int. Cl.[7] .................................................. G01C 9/06
(52) U.S. Cl. ............................ 33/366.24; 33/366.23; 356/4.07
(58) Field of Search .............................. 33/366.24, 365, 33/366.11, 366.15, 366.16, 366.23, 366.27; 356/4.07

(56) References Cited

U.S. PATENT DOCUMENTS

| | | |
|---|---|---|
| 2,427,902 A | 9/1947 | Clifton et al. |
| 3,813,556 A | 5/1974 | Beer et al. |
| 3,863,067 A | 1/1975 | Gooley |
| 4,154,000 A | 5/1979 | Kramer |
| 4,592,147 A * | 6/1986 | Herman ............... 33/366.16 |
| 5,042,158 A | 8/1991 | Schmelzer |
| 5,373,153 A | 12/1994 | Cumberledge et al. |
| 5,425,179 A | 6/1995 | Nickel et al. |
| 5,450,676 A | 9/1995 | Thornsberry |
| 6,202,488 B1 * | 3/2001 | Cash ..................... 33/366.23 |
| 6,392,223 B1 | 5/2002 | Hjertman et al. |
| 2002/0071114 A1 | 6/2002 | Yamaguchi |

* cited by examiner

Primary Examiner—Christopher W. Fulton
(74) Attorney, Agent, or Firm—Hooker & Habib, P.C.

(57) ABSTRACT

An inclination sensor includes a tubular chamber extending along a curved longitudinal axis. A mass is located within the chamber and moves by gravity to the lowest point of the chamber. A pair of location sensors are mounted on opposite ends of the chamber and determine the location of the mass along the chamber axis by emitting light toward the mass and measuring the intensity of the light reflected off the mass. The inclination of the inclination sensor is calculated from the axial location of the mass.

11 Claims, 1 Drawing Sheet

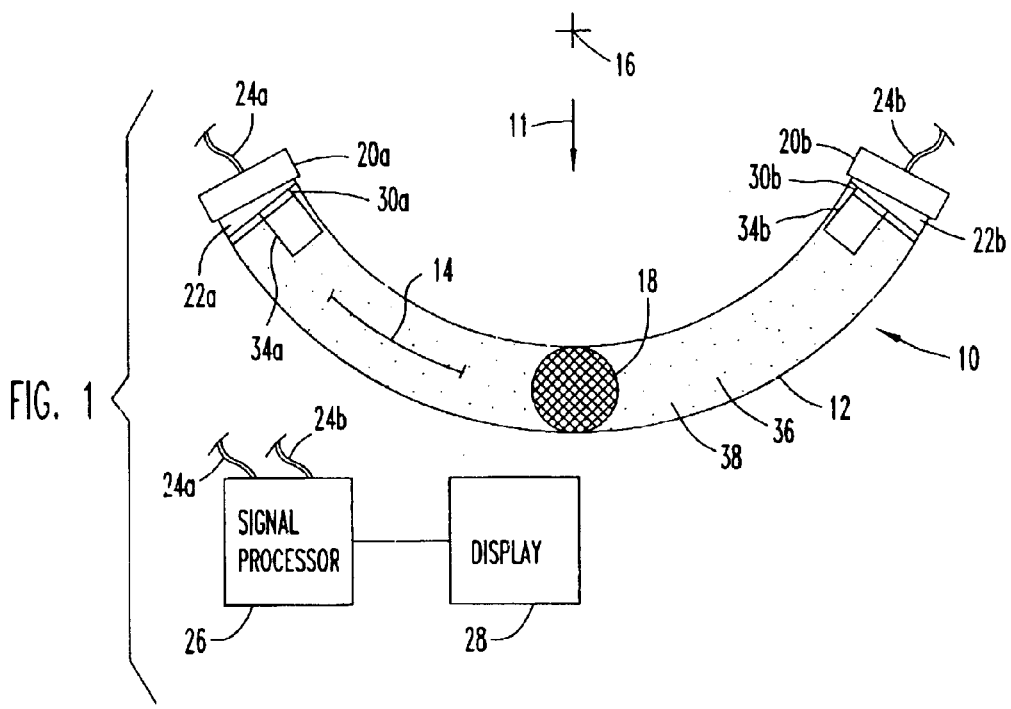
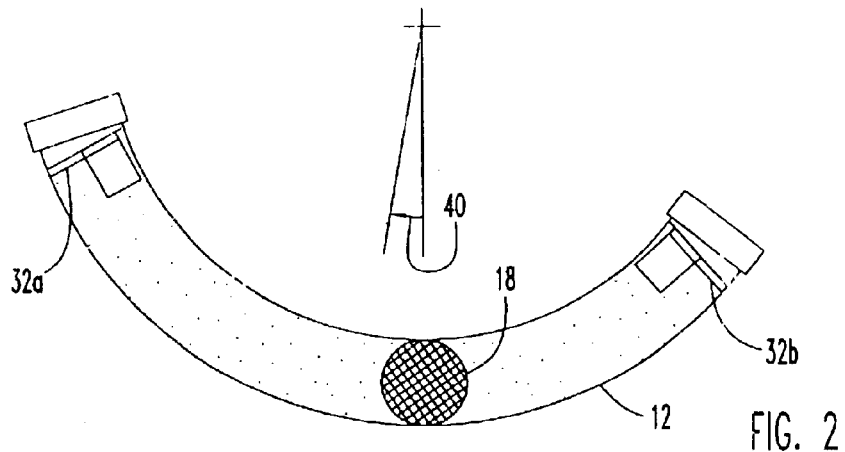
FIG. 1
FIG. 2
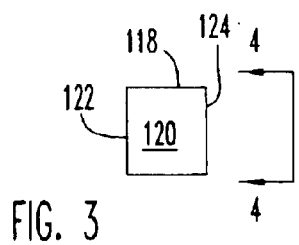
FIG. 3
FIG. 4

INCLINATION SENSOR

FIELD OF THE INVENTION

The invention relates to an inclination sensor for measuring angle of inclination with respect to gravity.

BACKGROUND OF THE INVENTION

Lawn and garden equipment such as tractors and riding lawn mowers are often operated on slopes or grades where there is a risk of roll-over. The operator may be unaware that the equipment is being operated near its roll-over limit. Monitoring the orientation of the equipment and actuating an alarm when the equipment nears the limit may avoid an impending roll-over.

Inclination sensors measure angular orientation and monitor equipment orientation. One conventional type of inclination sensor uses a weight that rolls along a curved surface. Gravity urges the weight to roll to the lowest point along the surface. Light emitters spaced along the surface are located across photo-detectors. The weight blocks the light between emitter-detector pairs as it moves along the surface in response to changing inclination. Determining the location of the weight along the surface enables the inclination angle to be calculated.

This known sensor, however, requires a large number of emitter-detector pairs. The inclination angle is measured in discrete steps and its angular resolution is limited by the spacing of the emitter-detector pairs.

Thus there is a need for an improved inclination sensor. The improved inclination sensor should provide substantially continuous monitoring of inclination angle in its operating range and should not require a large number of detectors.

SUMMARY OF THE INVENTION

The invention is an improved inclination sensor. The improved inclination sensor continuously monitors inclination angle with only a single emitter/detector pair, or alternatively, two emitter/detector pairs.

An inclination sensor in accordance with the present invention includes a tubular chamber extending along a curved longitudinal axis. A mass (weight) is located within the chamber, the mass movable along the chamber axis and urged to the lowest point of the chamber by the force of gravity. At least one location sensor is connected to the chamber for determining the location of the mass along the chamber axis. Each location sensor includes a radiation emitter that emits radiation (preferably visible light) from a first position towards the mass for reflecting radiation off the mass and a radiation detector disposed at a second location to detect the radiation reflected from the mass. The radiation detector generates a signal representing the intensity of the reflected light at the detector and thus the distance of the mass along the axis from the second position. The inclination of the inclination sensor is calculated from the signal.

In a preferred embodiment the inclination sensor includes a pair of location sensors, the sensors located at opposite ends of the chamber. A liquid is sealed in the chamber and attenuates the light traveling through the chamber. The liquid includes a coloring agent that couples the path of the light transmission along the chamber axis and enables the light to follow the curvature of the chamber.

Other objects and features of the invention will become apparent as the description proceeds, especially when taken in conjunction with the accompanying drawings illustrating inclination sensors of the present invention, of which the is one sheet of two embodiments.

BRIEF DESCRIPTION OF THE DRAWINGS

FIG. 1 is a front view of an inclination sensor in accordance with the present invention;

FIG. 2 is a view similar to FIG. 1 but with the inclination sensor inclined at an angle;

FIG. 3 is a front view of a second embodiment mass used in alternative embodiments of the invention; and FIG. 4 is a side view of the mass shown in FIG. 3 taken from lines 4–4 of FIG. 3.

DESCRIPTION OF THE PREFERRED EMBODIMENTS

FIG. 1 illustrates an inclination sensor 10 in accordance with the present invention. The inclination sensor is in a gravity field represented by arrow 11, the arrow pointing in the downward direction defined by gravity. The inclination sensor 10 includes an elongated tubular chamber 12 that extends along a curved longitudinal axis 14. The chamber 12 is formed from a nylon tube having a circular cross-section. The axis 14 has a fixed radius of curvature with respect to a center point 16. Within the tubular chamber 12 is a weight or mass 18. The mass 18 is a spherical ball bearing that is free to roll along the axis 14 and is urged by gravity to roll to the lowest point in the chamber.

Mounted on the ends of the tubular chamber 12 are a pair of plugs 20a, 20b that close the open ends of the chamber. Mounted on the plugs 20a, 20b are like location sensors 22a, 22b that determine the axial location of the mass 18 in the chamber 12. Each location sensor 22 generates a signal 24 that represents the location of the mass 18 along the chamber axis. The signals 24a, 24b are fed to a signal processor 26 that determines the inclination of the tilt sensor 10 from the measured position of the mass 18 and drives a video screen or display Output 28 that displays the inclination angle. The signal processor can also control an alarm (not shown) if the inclination angle reaches a predefined maximum.

The location sensors 22a, 22b determine the location of the mass 18 by emitting energy, preferably light energy, towards the mass. The mass acts as an energy reflector and reflects the energy away from it. By measuring the intensity of the energy reflected off the mass, the location of the mass is determined. In other possible embodiments sound energy or electromagnetic energy outside of visible light frequencies can be used.

Each location sensor includes an energy emitter 30 that emits light towards the mass 18 and an energy receiver 32 that receives light reflected from the mass 18. In the illustrated embodiment the energy emitter consists of a light-emitting diode (LED) mounted in the tube 12. The LED 30 emits light through a collimating tube 34 extending into the tube 12. The tube 34 aligns the path of the emitted light and increases the efficiency of the energy emitter 30. The energy receiver consists of a photo-resister 32 that faces the interior of the tube 12 adjacent the tube 34 and is exposed to the light reflected from the mass 18. The resistance of a photo-resister varies with the intensity of incidental light on the resister and so the resistance of the resister 32 varies with the intensity of the light reflected from the mass 18.

In the illustrated embodiment the tube 12 is filled with a liquid 36, preferably rubbing alcohol. Glycerine or kerosene could also be used. The liquid 36 dampens the motion of the mass 18 and helps isolate the mass 18 from vibrations or other transient disturbances. The plugs 20a, 20b fluidly seal the open ends of the tube 12. The diameter of the mass 18 is less than the inner diameter of the tube 12 such that the clearance between the mass and the walls of the tube 12 enables the mass 18 to move through the liquid 36.

The liquid 36 also includes food coloring (represented as particles 38) that couples the path of the light emitted from each LED along the chamber axis. The nylon tube 12 and the colored rubbing alcohol in effect form a "fiber-optic" conduit that enables the transmitted light and reflected light to follow the curved chamber axis towards and away from the mass 18. The liquid and colorant should not be corrosive to the tube 12 or the mass 18, and should provide substantially constant light transmission throughout the intended operating temperature range of the sensor.

Operation of the inclination sensor 10 will now be discussed. The location sensors 22a, 22b operate independently of each other to locate the axial position of the mass 18. The LEDS 30a, 30b and the photo-resistors 32a, 32b are located at predetermined axial locations near the ends of the tube 12. Light emitted from an LED travels along the tube, reflects off the mass 18, and travels back to the photo-resistor 32a or 32b adjacent the LED. The intensity of the reflected light received at each photo-resisters 32 is a function of the distance the light travels from the emitter to the mass and from the mass back to the reflector. The intensity decreases with distance. Circuitry (not shown) of each location sensor 22 generates a voltage signal 24 proportional to the light intensity falling on the photo-resistor 32.

The voltage signals 24a, 24b are read by the signal sensor 26. The signal sensor 26 includes a microprocessor that evaluates each signal 24a, 24b and calculates the distance the mass 18 is from the corresponding photo-resistor 32. The signal sensor 26 includes an in-memory look-up table that stores signal voltages and corresponding distance values. The table values can be obtained by positioning a sensor 10 at different inclination angles and measuring the signal 24 at each angle.

The change of intensity with inclination angle is a function of the intensity of the light emitted by the LEDs 30, the sensitivity of the energy receivers 32, the light transmission characteristics of the liquid mixture 36, 38, the size and shape of the sensor mass 18 and the reflectivity of its outer surface, and the size, shape and composition of the tubular chamber 12. By measuring the signal output as a function of inclination angle by test, these factors are automatically accounted for in a given sensor design.

The microprocessor obtains the appropriate values from the table and interpolates the values of the signals 24 to determine the axial location of the mass 18. The table values are preferably spaced so as to provide effectively continuous sensing of inclination angle. In variant embodiments the microprocessor could apply a mathematical formula or other algorithm to determine distance or to extrapolate values outside of the look-up table. The microprocessor calculates the inclination angle from the axial position of the mass 18.

FIG. 1 illustrates the inclination sensor at a zero inclination, that is, with the lowest point of the tube 12 midway between the ends of the tube. The mass 18 is at the lowest point of the tube 12. The signal processor 26 determines that the mass 18 is axially centered along the tube from the intensity of the reflected radiation as previously described.

FIG. 2 illustrates the inclination sensor inclined at an inclination angle 40 (ten degrees clockwise as shown in the figure). The lowest point of the tube 12 has shifted axially to the left from the midpoint and the mass 18 has rolled to that point. The intensity of the reflected radiation at the photo-resister 32a increases and at photo-resister 32b decreases. The signal processor 26 (see FIG. 1) evaluates the axial position of the mass 18 and calculates the ten degree clockwise inclination of the sensor.

The two signals 24a, 24b represent independent position measurements of the mass 18. If the position calculated from each signal 24a, 24b differ by a predetermined tolerance, an alarm can be actuated indicating a faulty operating condition. In other sensor embodiments having two location sensors similar to the sensor 10, the two sensors may together provide independent position measurements over an intermediate range of inclination angles and only one or the other location sensor provides a usable signal at other inclination angles. Other embodiments may have only one location sensor.

The chamber 12 of the illustrated sensor 10 has a constant radius of curvature. In other embodiments the chamber's curvature may change along the axis. For example, the intermediate portion of the chamber may have a larger radius of curvature to generate a greater displacement of the mass 18 for a given change in inclination angle.

FIG. 3 illustrates an alternative mass 118 of a second embodiment sensor similar to the sensor 10. The mass 118 is otherwise identical to the mass 18 but is configured to reflect a higher percentage of incident light towards the location sensors. It includes a cylindrical body 120 and axially opposite, planar sides 122, 124. The mass 118 slides in the tubular chamber instead of rolling like the mass 18. The flat sides 122, 124 reflect a greater amount of light back to the photo-resisters as compared to the spherical mass 18.

In other possible embodiments, the location sensors may have energy sources away from the tubular chamber. For example, a fiber optic wire could conduct light from a laser or other light source remote from the chamber into the chamber. In yet other embodiments the energy source could provide discrete pulses of energy rather than a continuous source of energy. Preferably the pulses occur at a frequency sufficient to provide the perception of the continuous sensing of inclination angle.

While we have illustrated and described preferred embodiments of our invention, it is understood that these are capable of modification, and we therefore do not wish to be limited to the precise details set forth, but desire to avail ourselves of such changes and alterations as fall within the purview of the following claims.

What we claim as our invention is:

1. An inclination sensor operable in a local gravity field, the sensor comprising:

an elongate tubular chamber extending along a curved longitudinal axis;

a mass within the chamber, the mass movable along the chamber axis to the lowest point of the chamber by the force of gravity; and at least one location sensor connected to the chamber for determining the location of the mass along the chamber axis, each location sensor comprising a radiation emitter disposed to emit radiation from a first position towards the mass for reflecting radiation off the mass, a radiation detector disposed at a second location to detect the radiation reflected from the mass and generating a signal representing the intensity of the detected radiation and thereby the distance of the mass along the axis from the second position; and means for calculating the inclination of the sensor from the signal.

2. The inclination sensor according to claim 1 wherein the radiation emitter emits light and the radiation detector detects light.

3. The inclination sensor according to claim 2 wherein the radiation detector comprises a photoresistor disposed to detect the reflected light.

4. The inclination sensor of claim 1 comprising a liquid sealed within the chamber.

5. The inclination sensor of claim 4 wherein the liquid couples the path of the emitted radiation along the chamber axis.

6. The inclination sensor of claim 5 wherein the chamber comprises a first open end and the inclination sensor comprises a plug fluidly sealing the first open end, the radiation detector and the light emitter mounted on the plug.

7. The inclination sensor of claim 1 wherein the mass is configured to roll along the tubular chamber.

8. The inclination sensor of claim 1 wherein the radiation detector and the light emitter are disposed to face the interior of the chamber.

9. The inclination sensor of claim 8 wherein the light emitter includes a collimating tube extending into the chamber.

10. The inclination sensor of claim 8 wherein the chamber comprises a first open end and the inclination sensor comprises a plug closing the end, and the radiation detector and the light emitter are mounted on the plug.

11. The inclination sensor of claim 8 wherein the chamber comprises axially opposed first and second open ends and the inclination sensor comprises a first plug closing the first end, a second plug closing the second end, and the at least one location sensor comprises first and second location sensors, the radiation detector and radiation emitter of the first location sensor mounted on the first plug and the radiation detector and the radiation emitter of the second location sensor mounted on the second plug whereby motion of the mass towards one location sensor is motion of the mass away from the second location sensor.

* * * * *